(No Model.) 2 Sheets—Sheet 1.
H. R. LEONARD.
Means for Sinking Tubes and Running Tunnels and Drifts by Pneumatic Pressure.
No. 235,955. Patented Dec. 28, 1880.
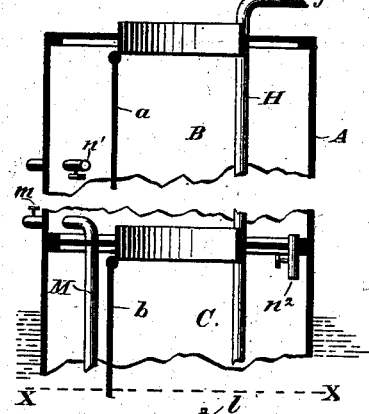
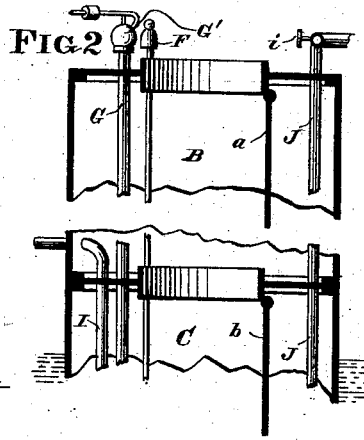
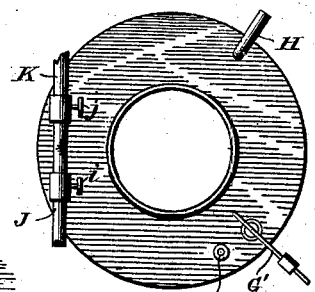
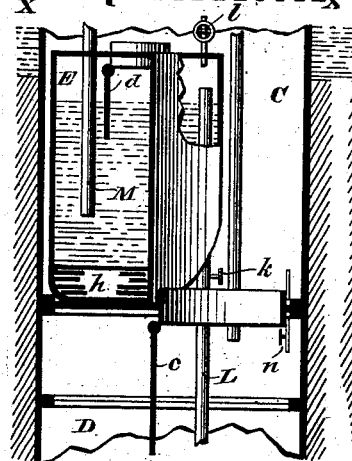
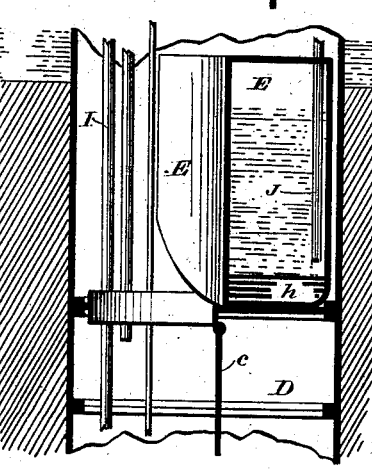
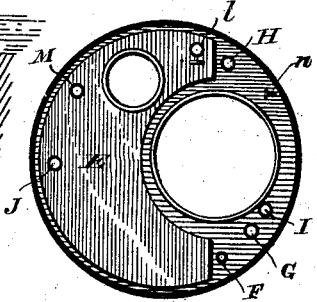
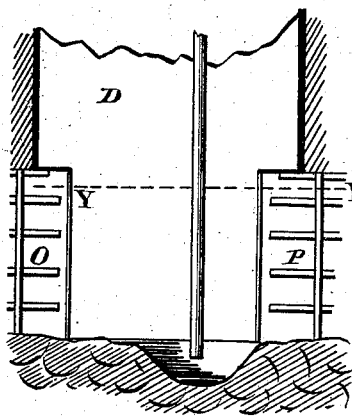
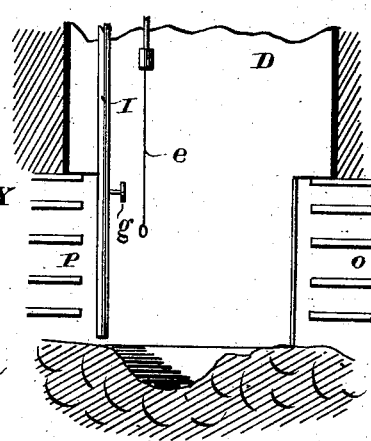
WITNESSES
Wilmer Bradford
Edward McClain
INVENTOR
Harvey R. Leonard
By C. W. M. Smith
Attorney (No Model.) 2 Sheets—Sheet 2.
H. R. LEONARD.
Means for Sinking Tubes and Running Tunnels and Drifts by Pneumatic Pressure.
No. 235,955. Patented Dec. 28, 1880.
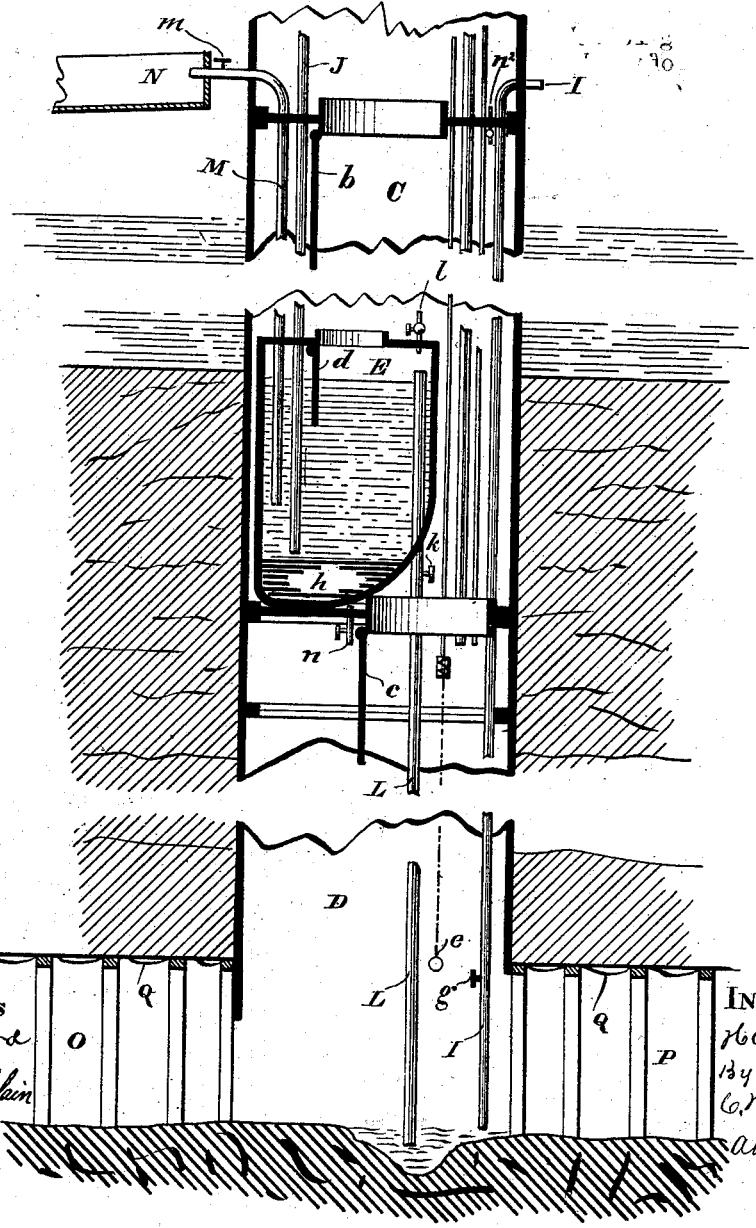
WITNESSES
Wilmer Bradford
Edward M. Selwin
INVENTOR
Harvey R. Leonard
By C. N. M. Smith
attorney.

UNITED STATES PATENT OFFICE.

HARVEY R. LEONARD, OF SAN FRANCISCO, ASSIGNOR OF ONE-THIRD TO ROBERT W. ELLIOTT, OF OAKLAND, CALIFORNIA.

MEANS OF SINKING TUBES AND RUNNING TUNNELS AND DRIFTS BY PNEUMATIC PRESSURE.

SPECIFICATION forming part of Letters Patent No. 235,955, dated December 28, 1880.

Application filed April 19, 1880. (No model.)

*To all whom it may concern:*

Be it known that I, HARVEY R. LEONARD, of San Francisco, in the county of San Francisco and State of California, have invented a new and Improved Means of Sinking Tubes or Caissons and Running Tunnels and Drifts by Pneumatic Pressure, of which the following is a full, clear, and exact description.

Heretofore great difficulty has been encountered in sinking caissons or tubes in the beds of rivers and constructing adits, drifts, or tunnels therefrom in a manner so as to protect the workmen without exposing them to imminent peril and death, or, at best, to keep them employed at the bottom of the tube for a short period of time only. This is mainly owing to the superincumbent weight of the atmospheric air at so great a depth, and the difficulty of removing the débris and water, to say nothing of the incoming water or earthy matter to endanger life. On account of these great obstacles to be met with much valuable property in deep-river mining has been permitted to lie unprospected or worked during a long period of time, or since washing for gold in gulches, ravines, and rivers in California has been practiced, and this vast area has been constantly accumulating more and more débris from the constant agitation of the soil in washing out and sluicing in hydraulic mining, until the aggregation alone has reached the depth in many places of fifty feet; and this, when added to the original depth before reaching the bed-rock, would make the total vertical depth through which to sink a tube one hundred feet or more.

The object of my invention is to provide a tube or caisson that is capable of being safely sunk in a vertical position to the bed-rock of rivers in which auriferous deposits are supposed or known to exist, and from thence to run adits, tunnels, or drifts along the bed-rock to all desired points, and force the removed material, by atmospheric pressure or compressed air, out through the said caisson or into an auxiliary and amalgamating chamber located near the bottom of the caisson; and the invention consists in the construction and arrangement of the various parts of the apparatus, as hereinafter more fully described.

Figure 1 is a central vertical section, looking to the left, of a pneumatic tube embodying my improvements. Fig. 2 is a central vertical section of the same, looking to the right. Fig. 3 is a plan view of the top of my tube. Fig. 4 is a cross-section on line X X of Fig. 1, looking downwardly. Fig. 5 is a cross-section on line Y Y of Fig. 1, looking downwardly. Fig. 6 is a vertical section of my pneumatic tube, showing the pipes as arranged in a more compact form.

Similar letters refer to similar parts throughout the several views.

The tube A and chamber E, I construct preferably of wrought-iron in sections, which are to be bolted together and provided with a suitable packing, so as to render the joints airtight.

In the upper part of the tube are constructed two compartments, B and C, provided with air-tight doors $a$ and $b$, which open downwardly, and near the lower end of the tube I construct another air-tight compartment, D, having also an air-tight door, $c$, opening downward.

The auxiliary chamber E is constructed at one side of the tube, near the lower door, $c$, through and into which several of the series of pipes pass, to be described hereinafter. The pipes passing through this vertical tube are adapted for various uses. The one represented at F is employed as a signal for the miners, and is provided with a whistle, which may be constructed after the manner of an ordinary steam-whistle. The present construction shows a valve-seat which may be kept in place by a coiled spring, the valve being operated by a pull-cord, $e$, which hangs within reach of the miners at the bottom of the shaft.

The pipe G carries a safety-valve, G', at its upper end, and extends downward into the lower compartment, D, and this valve is so set as to be opened and "blow off," should the atmospheric pressure become too great in the compartment D and the drifts for the workmen to bear, should they remain in the works during the operation of forcing out the water to the top of the tube. The compressed air which I employ is forced into the compartment D through the pipe H, and this pipe has a stop-cock, $f$.

I is a discharge or eduction pipe, through which the water or sand may be forced out through the tube during the operation of sinking to the bed-rock, and this pipe is provided with a stop-cock, $g$.

J is a pipe leading from the air-compressor downward into the compartment E, and extends nearly to the quicksilver bath $h$. The upper end of this pipe is provided with a branch pipe, K, through which steam is admitted to enliven and agitate the quicksilver bath when desired and to effect a more rapid amalgamation of the gold contained in the sands with the amalgam. These pipes are provided with stop-cocks $i$ $j$.

When the bed-rock has been reached in the downward progress of the tube the pipe L is employed to convey the auriferous or other sands up into the amalgamating-chamber E by means of the atmospheric pressure of the air, which is forced into the chamber D from the top of the tube, and this pipe L is also provided with a stop-cock, $k$.

A vent-cock, $l$, is placed in the top of compartment E, and this is to be kept open while the chamber E is being filled with material from the bottom of the shaft, and the door $d$ is to be closed.

M is a discharge-pipe leading from the compartment E to the sluice-box N, which receives the débris and sand coming from the amalgamating-chamber, and this pipe is provided with a stop-cock, $m$, to regulate the pressure upon the chamber and the flow of material out through the pipe into the box N.

$n$ $n'$ $n^2$ are equalizing vent-cocks for the purpose of allowing the air to escape, so that the doors $a$, $b$, and $c$ can be opened and closed when the pressure is on or off from the under side of the respective chambers.

The tunnels or drifts (represented at O and P) should be well timbered as the work progresses, and a canvas or other covering, Q, is to be placed around the tube and upper side or top of the drifts, and laid in before the timbers are placed in position, which serves to prevent the escape of the air up the outside of the tube.

The operation of my device will be as follows, to wit: The tube A (without the auxiliary compartment E and the lower partition and door, and also the pipes which enter the compartment E) is to be sunk, in the usual way, by using the compartments B and C and compressed-air pipe H and discharging-pipe I, until it is down to the bed-rock. In case, however, the distance to the bed-rock is very great, and the pressure of the condensed air is too great for the workmen to endure, then the lower door, $c$, and the compartment E are to be used, leaving the upper doors open while the men are at work. After the tube A has been sunken to the depth required, I place in position the compartment E, together with the several pipes which enter it. When connections have been made with the air-compressing machine and the steam-engine, and all other necessary machinery and appliances being in place, the operation will be proceeded with as follows: The cock $m$ and the upper door, $a$, are to be closed, and air is forced through the pipe H into the lower compartment, D, and the water will be discharged through the pipe I near the upper end of the tube. When a sufficient quantity of water has been removed the workmen may descend to the bottom of the shaft; then close the lower door, $c$; close the cock $g$ and the cock $m$, also the cock $n$; close the door $d$, and open cock $k$, when air is then forced through the pipe H until sufficient pressure is obtained to force the material containing the precious metals through the pipe L into the compartment E. By this system or means of protection the atmospheric pressure upon the men will be equal to the height of the pipe L, instead of the height at I or $m$, permitting them to labor without difficulty while the compartment E is being filled. When the compartment E has been nearly filled I close the door $d$ and cock $l$, and open cock $m$. Then close the cock $i$ and admit a current of steam through the branch pipe K and pipe J, which will permeate the charge or mass of material in the compartment E, and expand the quicksilver and scatter it through the charge, thus causing the finer particles of gold to become amalgamated with the quicksilver, and make the quicksilver active to take up the gold more readily. When this is accomplished I close the cock $j$ and open the cock $i$, and direct the current of air from the compressor through the pipe J, and the cock $m$ being opened, the contents of the tank or compartment will be forced out through the pipe M into the sluice-box N, to be cleaned up. When the compartment E is empty the cocks $i$, $j$, and $m$ are closed, and the cocks $f$, $l$, and $k$ opened, when air is admitted to the lower compartment, and the whole operation is again repeated.

It is evident that this device may also be used for sinking to the bed-rock of rivers in order to lay the foundations of piers to support bridges, and for other like purposes, and for running adits, tunnels, or drifts not connected with gold-mining.

In order to more fully explain the advantage of the lower door, $c$, and the use of the auxiliary chamber E, it should be observed that if the tube were sunk in water alone, or in very thin mud, a pressure would have to be exerted sufficient to overcome the weight of a column of water equal to the distance from the bottom of the shaft to the line of the water-surface; but when there is a considerable depth of river-bed material, of the usual compact form, the progress of seepage will be retarded in proportion to the pressure below. As an illustration, I will say that if a river be turned on over dry ground, say fifty feet deep, it would require a certain time for the water to soak or penetrate down to that depth. If the ground is well filled and saturated with water and a pressure is put on from the tunnels or adits greater than the specific gravity of the water and a natural atmospheric pressure, the water will be driven out in the same way that it would soak or permeate downward. After a sufficient pressure is put in to disgorge the water from the drifts (which should be kept up for a corresponding time) the water will be driven out of the sands in the river-bed to such an extent that it can be kept out by a less pressure than is required to raise a column to the surface, and at the same time will retard the flow inward or to the tunnel. The principle involved is capillary in its nature. It is well known that capillarity is not confined to tubes which are called "capillary" tubes. It is known to exist in sponge, bread, and other porous substances, and, of course, the finer the grains the smaller the interstices between the grains will be, and the more completely will the compressed air keep the water from entering the tunnels. A certain quantity of water will be required for expeditious mining in this way, and while it will be admitted that water will find its level, time will be gained in the use of the auxiliary chamber, and safety to the workmen below, as, after the débris is sent into the tank E, a pressure can then be put on sufficient to raise it to any required height and not affect the men, who are working under a lighter pressure than that required to raise the water from the bottom to the top. In the meantime the pressure in the tunnels will not be sufficient to burst them—a danger to be guarded against. It will be seen that the pressure is to be used alternately in the auxiliary tank and the compartment D, and that when the water has gained or accumulated in the tunnels resort will be had to the first operation of throwing out the water through the pipe I when the men are out of the shaft.

Having thus described my invention, what I claim, and desire to secure by Letters Patent, is—

1. In the opening of tunnels and underground excavations, the method herein described of raising material from said excavations, which consists in forcing up said material by compressed air and dividing the lift through the agency of an auxiliary chamber or compartment, E, provided with suitable induction and eduction pipes, cocks, and valves, arranged and operating substantially as specified.

2. In combination with an air-tight tube or shaft adapted to the raising of materials or substances from undersunk foundations, the air-tight chambers B, C, and D, constructed and arranged substantially as shown and described.

3. In combination with an air-tight tube or shaft adapted to the raising of solid and liquid matters by means of compressed air, the auxiliary chamber D, constructed in the lower part of said shaft and having the induction and eduction pipes therein, arranged and operating substantially in the manner and for the purposes as herein set forth and specified.

4. In combination with the compartment E, the quicksilver bath $h$ and the pipes L and J, the latter having branch steam-pipe K, all constructed and arranged substantially as and for the purpose set forth.

In testimony that I claim the foregoing I have hereunto set my hand and seal this 7th day of April, 1880.

HARVEY R. LEONARD. [L. S.]

Witnesses:
C. W. M. SMITH,
W. P. COLEMAN.